(12) United States Patent
Nakamoto et al.

(10) Patent No.: US 9,806,358 B2
(45) Date of Patent: Oct. 31, 2017

(54) POWER GENERATION SYSTEM, AND METHODS FOR STARTING AND OPERATING FUEL CELL IN POWER GENERATION SYSTEM

(71) Applicant: MITSUBISHI HITACHI POWER SYSTEMS, LTD., Kanagawa (JP)

(72) Inventors: Yukimasa Nakamoto, Tokyo (JP); Kazunori Fujita, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 279 days.

(21) Appl. No.: 14/438,235

(22) PCT Filed: Oct. 28, 2013

(86) PCT No.: PCT/JP2013/079150
§ 371 (c)(1),
(2) Date: Apr. 24, 2015

(87) PCT Pub. No.: WO2014/069408
PCT Pub. Date: May 8, 2014

(65) Prior Publication Data
US 2015/0295256 A1  Oct. 15, 2015

(30) Foreign Application Priority Data

Oct. 31, 2012  (JP) .................................. 2012-240675
Oct. 31, 2012  (JP) .................................. 2012-240676

(51) Int. Cl.
*H01M 8/04*     (2016.01)
*H01M 8/04111*  (2016.01)
(Continued)

(52) U.S. Cl.
CPC .... *H01M 8/04111* (2013.01); *H01M 8/04223* (2013.01); *H01M 8/04395* (2013.01);
(Continued)

(58) Field of Classification Search
CPC ......... H01M 8/04111; H01M 8/04395; H01M 8/04753; H01M 8/0662; H01M 8/04223; Y02E 60/563
See application file for complete search history.

(56) References Cited

U.S. PATENT DOCUMENTS

| 9,083,016 B1 * | 7/2015 | Saito .................... H01M 8/0662 |
| 2011/0059377 A1 * | 3/2011 | Scotto ............... H01M 8/04223 |
| | | 429/416 |
| 2013/0221674 A1 * | 8/2013 | Ozawa ...................... F02C 3/28 |
| | | 290/54 |

FOREIGN PATENT DOCUMENTS

| CN | 1630124 | 6/2005 |
| JP | 7-105963 | 4/1995 |

(Continued)

OTHER PUBLICATIONS

Decision of a Patent Grant dated Nov. 8, 2016 in corresponding Japanese Application No. 2012-240676, with English translation.
(Continued)

*Primary Examiner* — Mark F Huff
*Assistant Examiner* — Monique Wills
(74) *Attorney, Agent, or Firm* — Wenderoth, Lind & Ponack, L.L.P.

(57) ABSTRACT

The present invention enables a fuel cell to be stably started by minimizing a lack of air in a gas turbine when starting the fuel cell. This fuel cell system comprises: a gas turbine (11) having a compressor (21) and a combustor (22); a first compressed air supply line (26) that supplies compressed air (A1), which has been compressed by the compressor, to the combustor; a solid oxide fuel cell (SOFC) (13) having an air electrode and a fuel electrode; a second compressed air supply line (31) that supplies partially compressed air (A2), which has been compressed by the compressor, to the air electrode; a blower (33) that is disposed on the second (Continued)

compressed air supply line, and raises the pressure of the compressed air (A2); a circulation booster line (60) connecting the upstream side and downstream side of the blower in the second compressed air supply line; a control valve (61) disposed on the circulation booster line; a control valve (63) disposed between the circulation booster line in the second compressed air supply line and the SOFC; and a control device (62) that closes the control valves and opens the control valves to start the blower when starting the SOFC.

8 Claims, 6 Drawing Sheets

(51) Int. Cl.
    *H01M 8/0438*      (2016.01)
    *H01M 8/04746*      (2016.01)
    *H01M 8/0662*      (2016.01)
    *H01M 8/04223*      (2016.01)
    *H01M 8/124*      (2016.01)

(52) U.S. Cl.
    CPC ..... *H01M 8/04753* (2013.01); *H01M 8/0662* (2013.01); *H01M 2008/1293* (2013.01); *H01M 2250/407* (2013.01); *Y02E 60/563* (2013.01)

(56) References Cited

FOREIGN PATENT DOCUMENTS

| | | |
|---|---|---|
| JP | 8-88016 | 4/1996 |
| JP | 9-237634 | 9/1997 |
| JP | 2000-123853 | 4/2000 |
| JP | 2007-280676 | 10/2007 |
| JP | 2007-303559 | 11/2007 |
| JP | 2008-47504 | 2/2008 |
| JP | 2009-205930 | 9/2009 |
| JP | 2009-205932 | 9/2009 |

OTHER PUBLICATIONS

Decision to Grant a Patent dated Dec. 6, 2016 in Japanese Application No. 2012-240675, with English translation.
Notification of Grant of Invention Patent and Notification of Completion of Formalities for Registration dated Jan. 3, 2017 in corresponding Chinese Application No. 201380056197.4, with English translation.
Office Action dated May 31, 2016 in corresponding Japanese Application No. 2012-240676, with English translation.
Written Opinion of the International Searching Authority dated Jan. 21, 2014 in International (PCT) Application No. PCT/JP2013/079150.
International Search Report dated Jan. 21, 2014 in International Application No. PCT/JP2013/079150.
Office Action dated Jul. 1, 2016 in Chinese Application No. 201380056197.4, with English translation.

* cited by examiner

POWER GENERATION SYSTEM, AND METHODS FOR STARTING AND OPERATING FUEL CELL IN POWER GENERATION SYSTEM

TECHNICAL FIELD

The present invention relates to a power generation system that combines a fuel cell, a gas turbine, and a steam turbine, and to methods for starting and operating the fuel cell in the power generation system.

BACKGROUND ART

A solid oxide fuel cell (hereinafter, SOFC) as a fuel cell is widely known as a highly efficient fuel cell having wide use. Such an SOFC has a high operating temperature in order to increase ionic conductivity. Thus, air that has been expelled from a compressor of a gas turbine is usable as the air supplied to an air electrode (as an oxidant). Also, the SOFC enables high-temperature fuel that has been unusable to be used as fuel for a combustor of the gas turbine.

Thus, for example, as described in the below-listed Patent Literature 1, various combinations of an SOFC, a gas turbine, and a steam turbine have been proposed as a power generation system that achieves high power generation efficiency. The combined system described in Patent Literature 1 is provided with an SOFC, a gas turbine combustor that combusts exhaust fuel gas and exhaust air expelled from the SOFC, and a gas turbine having a compressor that compresses air for supply to the SOFC.

CITATION LIST

Patent Literature

Patent Literature 1: Japanese Unexamined Patent Application Publication No. 2009-205930A

SUMMARY OF THE INVENTION

Technical Problem

In a conventional power generation system as described above, the gas turbine is operated first and a portion of the air compressed by the compressor of the gas turbine is supplied to the SOFC such that the SOFC is pressurized, and the SOFC is subsequently started. In such a case, an outlet pressure of the compressor of the gas turbine and an inlet pressure of the combustor of the gas turbine, to which exhaust fuel gas expelled from the SOFC is supplied, are held constant, and in order to add a pressure-loss amount thereto to produce a flow supplying the compressed air to the SOFC, it is preferable that the compressed air A2 flow by a blower. However, during a period from operation start to rated operation, the blower experiences rapid fluctuations in internal pressure, flow rate, or the like, such that operation is unstable. For this reason, the flow rate of the compressed air is increased rapidly accompanying the operation start of the blower, and the compressed air is directed toward the SOFC, causing the compressed air for the combustor of the gas turbine to be likely insufficient. As a result, in the combustor, a combustion gas may become high in temperature due to shortage of air for combustion, and, in the combustor, the turbine, and the like, cooling may become insufficient due to shortage of air for cooling. Also, in order to prevent the shortage of compressed air for the combustor of the gas turbine caused by that the flow rate of the compressed air is rapidly increased accompanying the operation start of the blower and the compressed air is directed toward the SOFC, a proposal has been considered to block the outlet on the SOFC side of the compressor of the gas turbine and the inlet on the SOFC side of the combustor of the gas turbine. However, this prevents the starting of the blower.

An object of the present invention which is to solve the above-described problem is to provide a power generation system and a method for starting a fuel cell in the power generation system that enable stable starting while suppressing air shortage for a gas turbine during starting of the fuel cell.

Also, during rated operation of the conventional power generation system described above, the gas turbine changes in operation state in response to power generation conditions. In such a case, the outlet pressure of the compressor fluctuates. Therefore, the pressure of the compressed air supplied toward the SOFC is unstable. The SOFC is preferably operated in a stable state, where the pressure is controlled to be equal at the air electrode and at the fuel electrode, and where there is no interflow between the air and the fuel. When the pressure of the compressed air that is supplied is unstable, the operating state become unstable and this may impair the power generation efficiency.

An object of the present invention which is to solve the above-described problem is to provide a power generation system and a method for operating the fuel cell of the power generation system that enable the pressure of the compressed air supplied from the gas turbine to the fuel cell to be held constant.

Solution to Problem

A power generation system of the present invention to achieve the object includes: a gas turbine having a compressor and a combustor; a first compressed air supply line supplying compressed air compressed by the compressor to the combustor; a fuel cell having an air electrode and a fuel electrode; a second compressed air supply line supplying a portion of the compressed air compressed by the compressor to the air electrode; a booster provided in the second compressed air supply line, boosting pressure of the compressed air; a booster circulation line connected to an upstream side and to a downstream side of the booster in the second compressed air supply line; a first control valve provided in the booster circulation line; a second control valve provided between the booster circulation line and the fuel cell, in the second compressed air supply line; and a controller, during starting of the fuel cell, closing the second control valve while opening the first control valve and activating the booster.

Accordingly, during the starting of the fuel cell, the compressed air is circulated from the downstream side to the upstream side of the booster in the second compressed air supply line that supplies a portion of the compressed air compressed by the compressor to the air electrode. Therefore, at this time, there is no shortage of the compressed air that is supplied to the combustor, the turbine, and the like. This can suppress abnormal combustion in the combustor and insufficient cooling in the turbine. As a result, air shortage in the gas turbine is suppressed, such that stable starting is made possible.

The power generation system of the present invention includes a detector detecting at least one of the pressure and the flow rate of the compressed air in the booster, and the controller opens the second control valve while closing the first control valve upon at least one of the pressure and the flow rate detected by the flow rate detector reaching a predetermined value.

Accordingly, the compressed air is directed toward the fuel cell once the flow rate of the compressed air in a blower has stabilized, which enables air shortage in the gas turbine to be appropriately suppressed.

Also, a method for starting a fuel cell in a power generation system of the present invention involves the steps of: upon starting the fuel cell, activating a booster provided before an air electrode of the fuel cell to boost pressure of a portion of compressed air compressed by a compressor of the gas turbine as well as to circulate the portion of the compressed air from a downstream side to an upstream side of the booster; and, upon at least one of the pressure and the flow rate of the portion of the compressed air compressed by the compressor of the gas turbine reaching a predetermined value, supplying the compressed air to the air electrode of the fuel cell while boosting the pressure of the compressed air with the booster.

Accordingly, during the starting of the fuel cell, air shortage in the gas turbine is suppressed, such that stable starting is made possible with no shortage of compressed air in the combustor, the turbine, and the like.

A power generation system of the present invention for achieving the above-described objects includes: a gas turbine having a compressor and a combustor; a fuel cell having an air electrode and a fuel electrode; a compressed air supply line supplying a portion of compressed air compressed by the compressor to the air electrode; a pressure control valve provided in the compressed air supply line; a detector provided in the compressed air supply line, detecting pressure of the compressed air supplied to the air electrode; and a controller controlling an extent of opening of the pressure control valve in accordance with fluctuation in the pressure detected by the detector, such that the pressure of the compressed air supplied to the air electrode is held constant.

Accordingly, upon an outlet pressure of the compressor of the gas turbine fluctuating, the pressure of the compressed air is compensated for by controlling the extent of opening of the pressure control valve. Thus, the pressure of the compressed air supplied from the gas turbine to the fuel cell is held constant. As a result, the fuel cell runs with the compressed air having a stable pressure, which enables the fuel cell to be in a stable operation state and thus to stably generate electricity.

In the power generation system of the present invention, the pressure control valve is constituted by a plurality of control valves being arranged in parallel.

Accordingly, when controlling the extent of opening of the pressure control valve, for example, first a control valve having a smaller flow rate adjustment range is controlled, and then a control valve having a larger flow rate adjustment range is controlled. Performing control in this manner enables the control valve having the comparatively smaller flow rate adjustment range to complement the range of instability in operation when operation of the control valve having the comparatively large flow rate adjustment range begins. As a result, the control making the pressure of the compressed air constant is performed smoothly and accurately. Also, even when the plurality of control valves have the same flow rate adjustment range, the control making the pressure of the compressed air constant may also be performed smoothly and accurately by sequentially controlling the extent of opening.

Also, a method for operating a fuel cell in a power generation system of the present invention involves the steps of: supplying a portion of compressed air compressed by a compressor of a gas turbine to an air electrode of the fuel cell; and, upon pressure of the compressed air supplied to the fuel cell fluctuating, adjusting a flow rate of the compressed air, such that the pressure of the compressed air is held constant.

Accordingly, even upon the outlet pressure of the compressor of the gas turbine fluctuating, the flow rate of the compressed air is adjusted to hold the pressure of the compressed air constant. Thus, the pressure of the compressed air supplied from the gas turbine to the fuel cell is held constant. As a result, the fuel cell runs with the compressed air having a stable pressure, which enables the fuel cell to be in a stable operation state and thus to stably generate electricity.

Advantageous Effects of Invention

According to the power generation system and the method for starting a fuel cell in a power generation system of the present invention, a portion of compressed air compressed by a compressor of a gas turbine undergoes a boost in pressure by a booster provided before an air electrode of the fuel cell, and is supplied to the fuel cell upon being circulated from the downstream side to the upstream side of the booster. Thus, this enables air shortage in the gas turbine to be suppressed and enables stable starting. Also, in order to prevent the shortage of compressed air for the combustor of the gas turbine caused by that the flow rate of the compressed air is rapidly increased accompanying the operation start of the blower and the compressed air is directed toward the SOFC, the blower is allowed to start even with the outlet on the fuel cell side of the compressor of the gas turbine and the inlet on the fuel cell side of the combustor of the gas turbine being blocked.

According to the power generation system and the method for operating the fuel cell of the power generation system of the present invention, the pressure of the compressed air supplied from the gas turbine to the fuel cell can be held constant by adjusting the flow rate of the compressed air, even upon outlet pressure of the compressor of the gas turbine fluctuating.

DESCRIPTION OF EMBODIMENTS

Embodiment 1

A preferred embodiment of a power generation system and a method for starting a fuel cell in the power generation system according to the present invention is described in detail below, with reference to the accompanying drawings. Note that the present invention is not limited by the embodiment, and when a plurality of embodiments are present, the present invention is intended to include a configuration combining these embodiments.

The power generation system of Embodiment 1 is a Triple Combined Cycle (registered trademark) in which a solid oxide fuel cell (hereinafter, referred to as SOFC), a gas turbine, and a steam turbine are combined. This Triple Combined Cycle is able to extract electricity in the three stages of the SOFC, the gas turbine, and the steam turbine by disposing the SOFC on an upstream side of a gas turbine combined cycle (GTCC) power generation, and is thus able to realize extremely high power generation efficiency. Note that the following description is made with a solid oxide fuel cell employed as the fuel cell of the present invention; however, no limitation to this type of fuel cell is intended.

Figure 1:
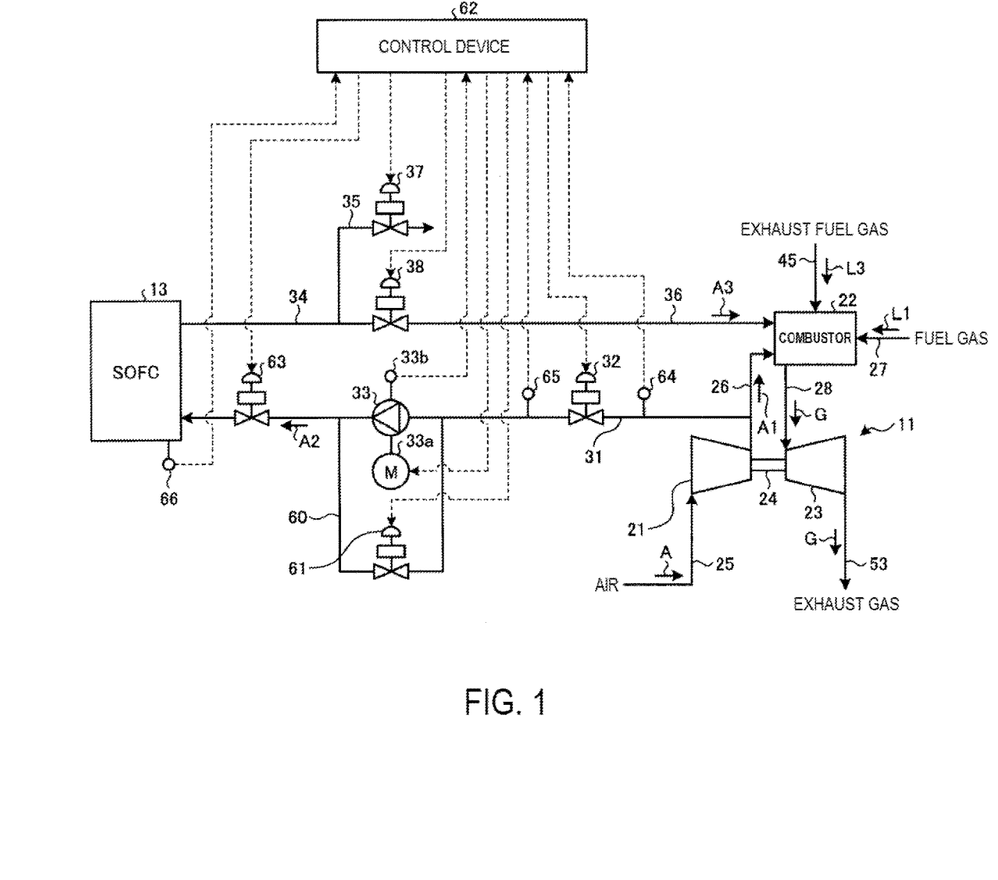
FIG. 1 is a schematic diagram illustrating a supply line for compressed air in a power generation system according to Embodiment 1 of the present invention.
Figure 2:
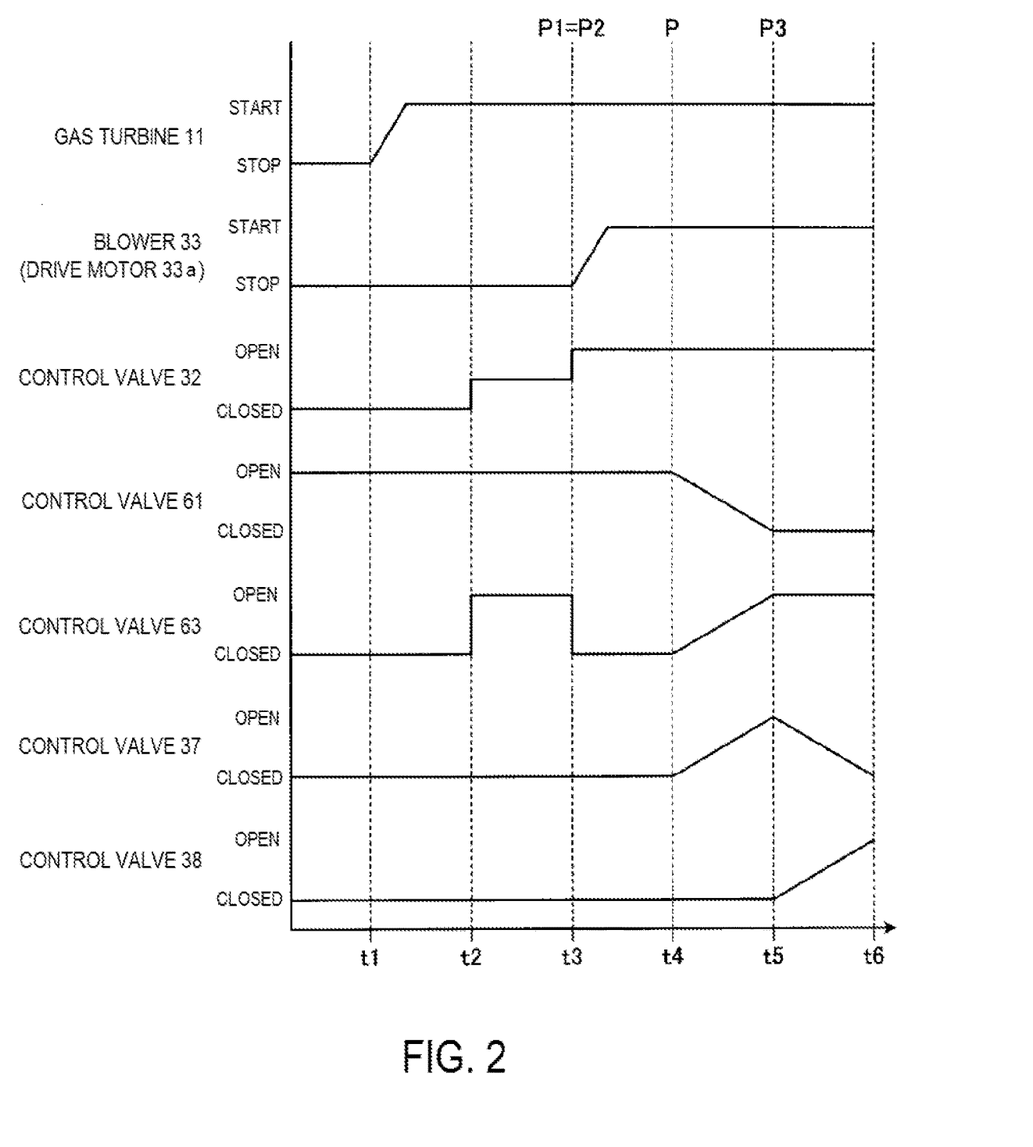
FIG. 2 is a timing chart showing the timing at which compressed air is supplied during starting of a solid oxide fuel cell in the power generation system of Embodiment 1.
Figure 3:
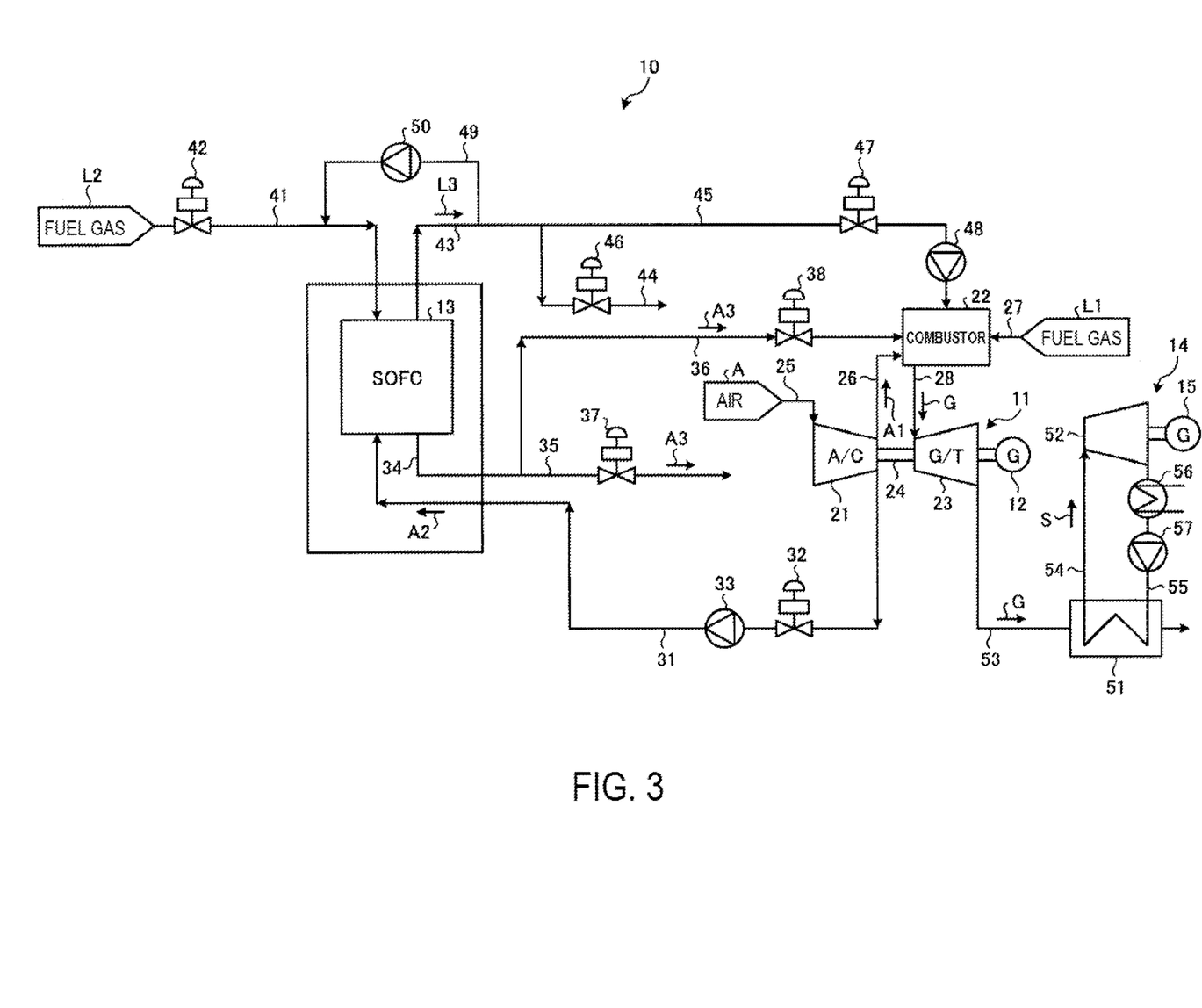
FIG. 3 is a schematic configuration diagram illustrating the power generation system of Embodiment 1.

FIG. 1 is a schematic diagram illustrating a supply line for compressed air in the power generation system according to Embodiment 1 of the present invention. FIG. 2 is a timing chart showing the timing at which compressed air is supplied during starting of the SOFC in the power generation system according to Embodiment 1. FIG. 3 is a schematic configuration diagram illustrating the power generation system according to Embodiment 1.

In Embodiment 1, as illustrated in FIG. 3, a power generation system 10 includes a gas turbine 11 and power generator 12, an SOFC 13, and a steam turbine 14 and power generator 15. The power generation system 10 combines power from the gas turbine 11, power from the SOFC 13, and power from the steam turbine 14, so as to be configured to achieve high power generation efficiency.

The gas turbine 11 includes a compressor 21, a combustor 22, and a turbine 23. The compressor 21 and the turbine 23 are coupled in an integrally rotatable manner by a rotating shaft 24. The compressor 21 compresses air A obtained by an air intake line 25. The combustor 22 combines and combusts compressed air A1 supplied from the compressor 21 through a first compressed air supply line 26 and fuel gas L1 supplied from a first fuel gas supply line 27. The turbine 23 is rotated by exhaust gas (combustion gas) G supplied from the combustor 22 through an exhaust gas supply line 28. Although not illustrated, the turbine 23 is supplied with the compressed air A1 compressed by the compressor 21 through a casing, and cools blades and the like by using this compressed air A1 as cooling air. The power generator 12 is provided coaxially with the turbine 23 and is able to generate power as the turbine 23 rotates. Note that, for example, liquefied natural gas (LNG) is used as the fuel gas L1 to be supplied to the combustor 22.

The SOFC 13 is supplied with a high-temperature fuel gas as a reductant and with high-temperature air (oxidizing gas) as an oxidant, which reacts at a predetermined operating temperature to generate power. This SOFC 13 is constituted by an air electrode, a solid electrolyte, and a fuel electrode that are housed in a pressure container. A portion of compressed air A2, which has been compressed by the compressor 21, is supplied to the air electrode and fuel gas is supplied to the fuel electrode, such that power is generated. Note that, here, as fuel gas L2 supplied to the SOFC 13, for example, a liquefied natural gas (LNG), hydrogen ($H_2$) and carbon monoxide (CO), a hydrocarbon gas such as methane ($CH_4$), gas manufactured in a gasification facility for carbonaceous materials such as coal, or the like is used. Also, the oxidizing gas supplied to the SOFC 13 includes approximately 15% to 30% oxygen. Typically, air is appropriate. However, in addition to air, mixed gas of combustion exhaust gas and air, mixed gas of oxygen and air, or the like may be used (hereinafter, the oxidizing gas supplied to the SOFC 13 is referred to as air).

This SOFC 13 is connected with a second compressed air supply line 31 that branches off from the first compressed air supply line 26, so as to be able to supply a portion of the compressed air A2 compressed by the compressor 21 to an introduction part of the air electrode. This second compressed air supply line 31 is provided with a control valve 32 that is capable of adjusting the volume of air to be supplied, and a blower (booster) 33 that is capable of boosting the pressure of the compressed air A2, along the air-flow direction. The control valve 32 is provided on the upstream side in the air-flow direction of the second compressed air supply line 31. The blower 33 is provided on the downstream side of the control valve 32. The SOFC 13 is connected with an exhaust air line 34 expelling exhaust air A3 that has been used by the air electrode. This exhaust air line 34 branches into a discharge line 35 that expels the exhaust air A3 used by the air electrode to the outside, and a compressed air circulation line 36 that is connected to the combustor 22. The discharge line 35 is provided with a control valve 37 that is capable of adjusting the volume of air to be expelled. The compressed air circulation line 36 is provided with a control valve 38 that is capable of adjusting the volume of air to be circulated.

The SOFC 13 is also provided with a second fuel gas supply line 41 that supplies the fuel gas L2 to the introduction part of the fuel electrode. The second fuel gas supply line 41 is provided with a control valve 42 that is capable of adjusting the volume of fuel gas to be supplied. The SOFC 13 is connected with an exhaust fuel line 43 expelling exhaust fuel gas L3 that has been used by the fuel electrode. The exhaust fuel line 43 branches into a discharge line 44 that performs expelling to the outside, and an exhaust fuel gas supply line 45 that is connected to the combustor 22. The discharge line 44 is provided with a control valve 46 that is capable of adjusting the volume of fuel gas to be expelled. The exhaust fuel gas supply line 45 is provided with a control valve 47 that is capable of adjusting the volume of fuel gas to be supplied, and with a blower 48 that is capable of boosting the pressure of fuel, along the fuel-flow direction. The control valve 47 is provided on the upstream side in the flow direction of fuel gas L3 of the exhaust fuel gas supply line 45. The blower 48 is provided on the downstream side in the flow direction of the fuel gas L3 of the control valve 47.

The SOFC 13 is also provided with a fuel gas recirculation line 49 that connects the exhaust fuel line 43 and the second fuel gas supply line 41. The fuel gas recirculation line 49 is provided with a recirculation blower 50 that recirculates the exhaust fuel gas L3 from the exhaust fuel line 43 into the second fuel gas supply line 41.

The steam turbine 14 rotates a turbine 52 with steam produced by a heat recovery steam generator (HRSG) 51. This heat recovery steam generator 51 is connected with an exhaust gas line 53 from the gas turbine 11 (turbine 23), and produces steam S through heat exchange between air and high-temperature exhaust gas G. The steam turbine 14 (turbine 52) is provided with a steam supply line 54 and a water supply line 55 between the turbine and the heat recovery steam generator 51. Then, the water supply line 55 is provided with a condenser 56 and a water supply pump 57. The power generator 15 is provided coaxially with the turbine 52 and is able to generate power as the turbine 52 rotates. Note that the exhaust gas G recovered by the heat recovery steam generator 51 is released into the atmosphere after removal of any toxic materials.

The operation of the power generation system 10 of Embodiment 1 is described next. When the power generation system 10 is started, the gas turbine 11, the steam turbine 14, and the SOFC 13 are started in the stated order.

First, in the gas turbine 11, the compressor 21 compresses the air A, the combustor 22 mixes the compressed air A1 with the fuel gas L1 and combusts the mixed gas, and the turbine 23 rotates due to the exhaust gas G. Thus, the power generator 12 begins to generate power. Next, in the steam turbine 14, the turbine 52 rotates due to the steam S produced by the heat recovery steam generator 51. Thus, the power generator 15 begins to generate power.

Subsequently, in the SOFC 13, first, the compressed air A2 is supplied, and a boost in the pressure as well as an increase in the temperature begins. The control valve 32 is opened to a predetermined extent while the control valve 37 of the discharge line 35 and the control valve 38 of the compressed air circulation line 36 are closed and the blower 33 of the second compressed air supply line 31 is stopped. Then, a portion of the compressed air A2 compressed by the compressor 21 is supplied from the second compressed air supply line 31 toward the SOFC 13. Accordingly, the pressure is raised on the SOFC 13 side by supplying the compressed air A2.

Meanwhile, in the SOFC 13, the fuel gas L2 is supplied to the fuel electrode side to boost the pressure. With the control valve 46 of the discharge line 44 and the control valve 47 of the exhaust fuel gas supply line 45 being closed and with the blower 48 being stopped, the control valve 42 of the second fuel gas supply line 41 is opened and the recirculation blower 50 of the fuel gas recirculation line 49 is driven. Then, the fuel gas L2 is supplied from the second fuel gas supply line 41 toward the SOFC 13, and the exhaust fuel gas L3 is recirculated by the fuel gas recirculation line 49. Accordingly, the pressure is raised on the SOFC 13 side by supplying the fuel gas L2.

Next, once the pressure on the air electrode side of the SOFC 13 reaches an outlet pressure of the compressor 21, the control valve 32 is fully opened and the blower 33 is driven. The control valve 37 is simultaneously opened and the exhaust air A3 from the SOFC 13 is expelled from the discharge line 35. Then, the compressed air A2 is supplied toward the SOFC 13 by the blower 33. The control valve 46 is simultaneously opened and the exhaust fuel gas L3 from the SOFC 13 is expelled from the discharge line 44. Next, once the pressure on the air electrode side and the pressure on the fuel electrode side of the SOFC 13 reach a target pressure, the boost in the pressure for the SOFC 13 ends.

Afterward, once the reaction (power generation) in the SOFC 13 stabilizes and the components of the exhaust air A3 and the exhaust fuel gas L3 stabilize, the control valve 37 is closed while the control valve 38 is opened. Then, the exhaust air A3 from the SOFC 13 is supplied to the combustor 22 through the compressed air circulation line 36. Also, while the control valve 46 is closed, the control valve 47 is opened and the blower 48 is driven. Then, the exhaust fuel gas L3 from the SOFC 13 is supplied to the combustor 22 through the exhaust fuel gas supply line 45. At this point, the fuel gas L1 supplied to the combustor 22 through the first fuel gas supply line 27 is reduced.

Here, the power generation by the power generator 12 due to the driving of the gas turbine 11, the power generation by the SOFC 13, and the power generation by the power generator 15 due to the driving of the steam turbine 14 are all active, such that the power generation system 10 is in steady state operation.

In the meantime, when the SOFC 13 is started in a typical power generation system, a portion of the air compressed by the compressor 21 of the gas turbine 11 is supplied to the SOFC 13 through the second compressed air supply line 31, such that the boost in the pressure is realized. Then, in Embodiment 1, the outlet pressure of the compressor 21 and an inlet pressure of the combustor 22, to which the exhaust fuel gas expelled by the SOFC 13 is supplied, are held constant, and, in order to add a pressure-loss amount thereto to produce a flow supplying the compressed air A2 to the SOFC 13, the compressed air A2 flows by the blower 33. However, during a period from operation start to rated operation, the blower 33 experiences rapid fluctuations in internal pressure, flow rate, and the like, such that operation is unstable. Therefore, the compressed air A2 has a flow rate rapidly increased during the operation start of the blower 33 and is then directed toward the SOFC 13. For the gas turbine 11, this poses a risk that the compressed air A1 supplied to the combustor 22 and the cooling air directed toward the turbine 23 may be insufficient.

As such, as illustrated in FIG. 1, the power generation system 10 of Embodiment 1 is provided with a booster circulation line 60 and a control valve (first control valve) 61 at the position of the blower 33. A control device (controller) 62 is configured to open a control valve 61 as the blower 33 activates during the starting of the SOFC 13.

In other words, during the starting of the SOFC 13, opening the control valve 61 as the blower 33 activates causes a portion of the compressed air A2 compressed by the compressor 21 of the gas turbine 11 to flow by the blower 33 while being circulated through the booster circulation line 60. Then, performing this until the operation of the blower 33 stabilizes in turn stabilizes the flow rate of the compressed air A2 directed toward the SOFC 13. Therefore, air insufficiency in the gas turbine 11 can be suppressed.

To explain in more detail, as illustrated in FIG. 1, the booster circulation line 60 is connected to the upstream side and the downstream side of the blower 33 along the second compressed air supply line 31, thus providing a detour around the blower 33. The control valve 61 is provided on the booster circulation line 60. Here, the blower 33 is driven by a drive motor 33a. Also, the blower 33 has a pressure detector 33b that detects the pressure of the compressed air A2 passing through an outlet thereof.

Further, the control valve (second control valve) 63 is provided on the second compressed air supply line 31, between the booster circulation line 60 and the SOFC 13.

Also, a first detector 64 is provided on the second compressed air supply line 31, between the compressor 21 and the control valve 32. This first detector 64 detects, on the upstream side of the control valve 32, a first pressure of the compressed air A2 compressed by the compressor 21 of the gas turbine 11.

In addition, a second detector 65 is provided on the second compressed air supply line 31, between the booster circulation line 60 and the control valve 32. This second detector 65 detects, on the downstream side of the control valve 32, a second pressure of the compressed air A2 compressed by the compressor 21 of the gas turbine 11.

Also, a third detector 66 is provided on the SOFC 13. This third detector 66 detects a third pressure at the air electrode of the SOFC 13, that is, closer to the SOFC 13 than the control valve 63 on the second compressed air supply line 31.

The control device 62 is capable of adjusting an extent of opening of the control valve 61 and the control valve 63, and is also capable of controlling starting and stopping of the blower 33 with the drive motor 33a. Also, the control device 62 is capable of adjusting an extent of opening of the control valve 32, the control valve 37, and the control valve 38. Further, the control device 62 takes input of the first pressure, the second pressure, and the third pressure respectively detected by the detectors 64, 65, 66. Additionally, the control device 62 takes input of the pressure detected by the pressure detector 33b in the blower 33.

Then, the control device 62, taking input of the first pressure, the second pressure, and the third pressure respectively detected by the detectors 64, 65, 66, and the pressure detected by the pressure detector 33b in the blower 33, controls the drive motor 33a, the control valve 61, the control valve 63, the control valve 32, the control valve 37, and the control valve 38 in accordance with these inputs.

Here, the method for starting the SOFC 13 in the power generation system 10 of Embodiment 1, which is controlled by the above-described control device 62, is described.

As illustrated in FIG. 2, at time t1, the gas turbine 11 is started, and power generation by the gas turbine 11 begins by time t2, which is reached once a predetermined time has elapsed. During the interval between the time t1 and the time t2, the blower 33 is stopped (the drive motor 33a is stopped), the control valves 32, 37, 38, 63 are closed, and the control valve 61 is open (but may also be closed).

Then, at the time t2, a starting instruction is acquired to start the SOFC 13. In this case, the gas turbine 11 may be in a low-load operation state or in a rated operation state. At the time t2, the control valve 32 is open to a predetermined extent that is less than fully open, while the control valve 63 is open. Then, the pressure is raised from the control valve 32 to the second compressed air supply line 31 via the booster circulation line 60, the SOFC 13, the compressed air circulation line 36 as far as the control valve 38, and the discharge line 35 as far as the control valve 37.

Later, at time t3, when a second pressure P2 of the second detector 65 becomes equal to a first pressure P1 of the first detector 64, the control valves 32, 61 are opened, the control valve 63 is closed (or may be partly closed while remaining open to a predetermined extent), and the blower 33 is activated (the drive motor 33a is driven). Then, a portion of the compressed air A2 compressed by the compressor 21 is circulated by the booster circulation line 60 from the downstream side to the upstream side of the blower 33. Here, the control valve 63 suppresses the supply of the compressed air A2 to the SOFC 13 and circulates the compressed air A2 through the booster circulation line 60. The control valve 63 may be partly closed while remaining open to a predetermined extent, or may be closed. This secures the circulation of the compressed air A2, so as to be able to securely suppress the effect of the compressed air A2, which has increased pressure due to the blower 33, on the SOFC 13 (e.g., fluctuations in the pressure of the SOFC 13 (third pressure P3)).

Then, at the time t4, when a pressure P of the blower 33 reaches a predetermined value of pressure for the blower 33 in rated operation, the control valve 61 is gradually closed while the blower 33 continues to be driven. At this time, the control valve 63 and the control valve 37 are gradually opened. Then, the compressed air A2, having increased pressure due to the blower 33, is supplied to the SOFC 13. At this time, the blower 33 is in rated operation and is thus operating with stability. Therefore, the flow rate of the compressed air A2 directed toward the SOFC 13 is stabilized. Also, at this time, the gradual opening of the control valve 63 and the control valve 37 can suppress rapid fluctuations in the third pressure P3 of the third detector 66, that is, in the pressure of the SOFC 13. Meanwhile, in the SOFC 13, the compressed air A2 flows to the SOFC 13 through the second compressed air supply line 31, such that the pressure of the SOFC 13 (third pressure P3) is gradually increased.

Then, at time t5, when the pressure of the SOFC 13 (third pressure P3) reaches a predetermined pressure for the SOFC 13, the control valve 61 is closed and the control valve 63 is opened while the blower 33 continues to be driven. Then, until time t6, by which the operation of the SOFC 13 stabilizes, the control valve 38 is gradually opened and the control valve 37 is gradually closed. Accordingly, the exhaust air A3 expelled from the SOFC 13 in rated operation is supplied to the combustor 22 from the exhaust air line 34 through the compressed air circulation line 36. Given that the operation of the blower 33 has stabilized, this exhaust air A3 is supplied stably to the combustor 22, with no rapid fluctuations. Therefore, in the gas turbine 11, the compressed air A1 from the compressor 21 that is supplied to the combustor 22, the cooling air that is directed toward the turbine 23, and the like are stably supplied without neither excess nor shortage.

Note that the control device 62 takes the pressure detected by the pressure detector 33b of the blower 33 as input, and at the time t4, when the pressure P of the blower 33 reaches a predetermined pressure value for the blower 33 in rated operation, gradually closes the control valve 61 while the blower 33 continues to be driven. The blower 33 may also have a flow rate detector that detects the flow rate of the compressed air A2 passing through the outlet thereof, instead of having this pressure detector 33b. In such a case, the control device 62 takes the flow rate detected by the flow rate detector of the blower 33 as input, and at the time t4, when the flow rate of the blower 33 reaches a predetermined flow rate for the blower 33 in rated operation, gradually closes the control valve 61 while the blower 33 continues to be driven.

As such, the power generation system of Embodiment 1 includes: the gas turbine 11 having the compressor 21 and the combustor 22; the first compressed air supply line 26 supplying the compressed air A1 compressed by the compressor 21 to the combustor 22; the SOFC 13 having the air electrode and the fuel electrode; the second compressed air supply line 31 supplying a portion of the compressed air A2 compressed by the compressor 21 to the air electrode; the blower 33 provided in the second compressed air supply line 31, boosting the pressure of the compressed air A2; the booster circulation line 60 connected to the upstream side and to the downstream side of the blower 33 in the second compressed air supply line 31; the control valve 61 provided in the booster circulation line 60; the control valve 63 provided between the booster circulation line 60 and the SOFC 13, in the second compressed air supply line 31; and the control device 62 activating the blower 33 by closing the control valve 63 while opening the control valve 61 during the starting of the SOFC 13.

Accordingly, during the starting of the SOFC 13, the compressed air A2 is circulated from the downstream side to the upstream side of the blower 33 along the second compressed air circulation line 31 that supplies a portion of the compressed air A2 compressed by the compressor 21 to the air electrode. Therefore, at this time, there is no shortage of the compressed air A1 that is supplied to the combustor 22, the turbine 23, and the like. This can suppress abnormal combustion in the combustor 22 and insufficient cooling in the turbine 23. As a result, air shortage in the gas turbine 11 is suppressed, such that stable starting is made possible.

In the power generation system of Embodiment 1, the blower 33 is provided with the detector 33b that detects at least one of the pressure and the flow rate of the compressed air A2, and when at least one of the pressure and the flow rate detected by the detector 33b reaches a predetermined value, the control device 62 opens the control valve 63 while closing the control valve 61. Accordingly, the compressed air A2 is directed toward the SOFC 13 once at least one of the pressure and the flow rate of the compressed air A2 in the blower 33 has stabilized, which enables air shortage in the gas turbine 11 to be appropriately suppressed.

Also, a method for starting a fuel cell in the power generation system of Embodiment 1 includes the steps of: upon starting the SOFC 13, boosting the pressure of a portion of the compressed air A2 compressed by the compressor 21 of the gas turbine 11 by activating the blower 33 provided before the air electrode of the SOFC 13 while circulating the portion of the compressed air A2 from the downstream side to the upstream side of the blower 33; and supplying the compressed air A2 to the air electrode of the SOFC 13 while boosting the pressure with the blower 33 when at least one of the pressure and the flow rate of the portion of the compressed air A2 compressed by the compressor 21 of the gas turbine 11 reaches a predetermined value.

Accordingly, during the starting of the SOFC 13, air shortage in the gas turbine 11 is suppressed, such that stable starting is made possible with no shortage of the compressed air A1 in the combustor 22, the turbine 23, and the like.

Embodiment 2

A preferred embodiment of a power generation system and a method for operating a fuel cell in the power generation system according to the present invention is described in detail below, with reference to the accompanying drawings. Note that the present invention is not limited by the embodiment, and when a plurality of embodiments are present, the present invention is intended to include a configuration combining these embodiments.

The power generation system of Embodiment 2 is a Triple Combined Cycle combining a solid oxide fuel cell (hereinafter, referred to as SOFC), a gas turbine, and a steam turbine. This Triple Combined Cycle is able to extract electricity in the three stages of the SOFC, the gas turbine, and the steam turbine by disposing the SOFC on an upstream side of a gas turbine combined cycle (GTCC) power generation, and is thus able to realize extremely high power generation efficiency. Note that the following description is made with a solid oxide fuel cell employed as the fuel cell of the present invention; however, no limitation to this type of fuel cell is intended.

Figure 4:
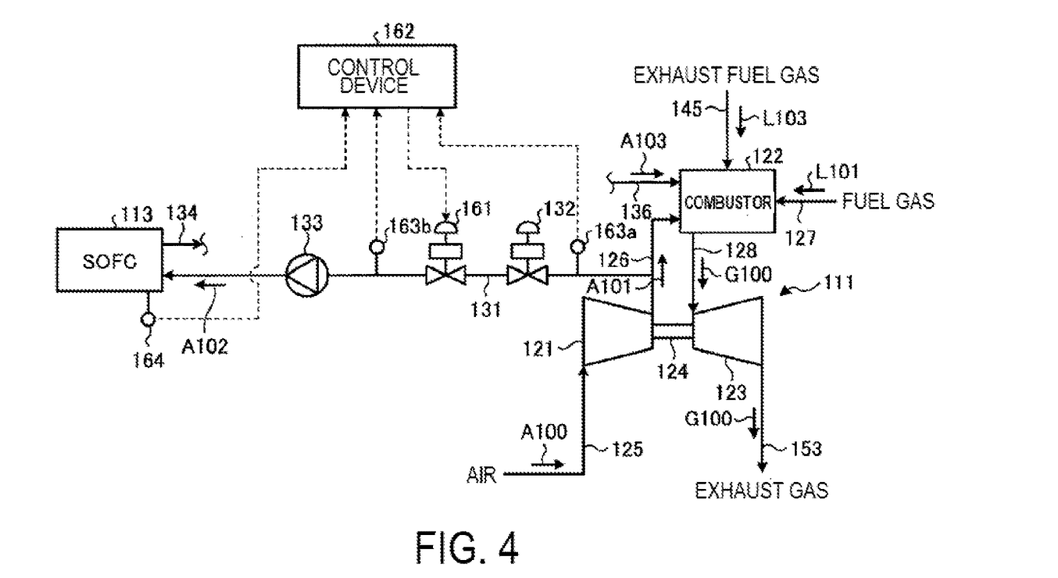
FIG. 4 is a schematic diagram illustrating a supply line for compressed air in a power generation system according to Embodiment 2 of the present invention.
Figure 5:
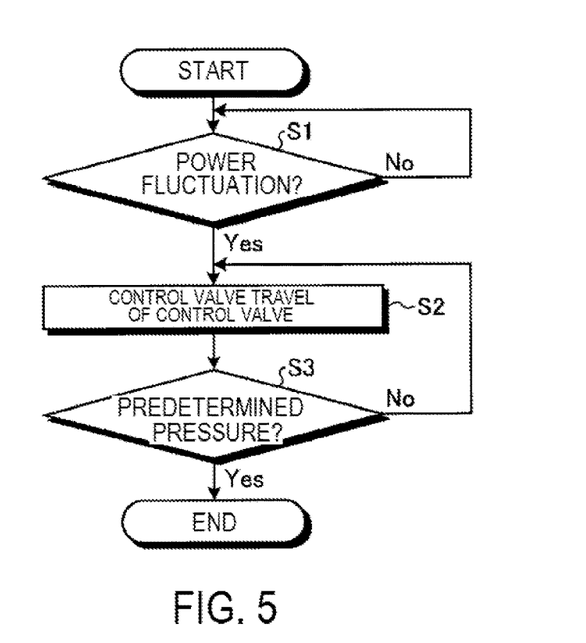
FIG. 5 is a flowchart of supplying compressed air during operation of a solid oxide fuel cell in the power generation system of Embodiment 2.
Figure 6:
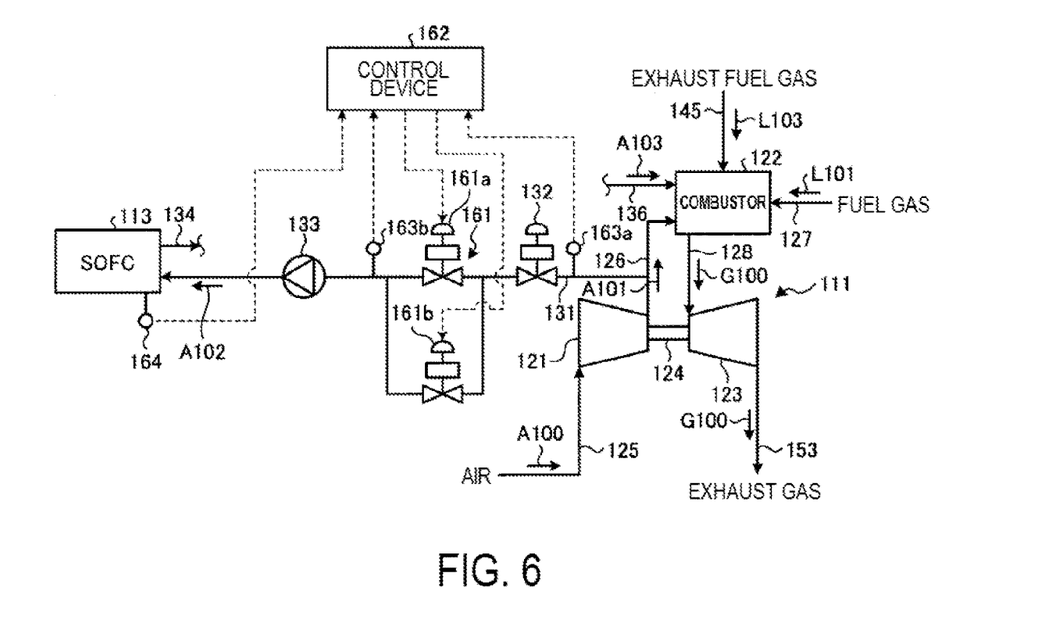
FIG. 6 is a schematic diagram illustrating a supply line for compressed air in another power generation system according to Embodiment 2.
Figure 7:
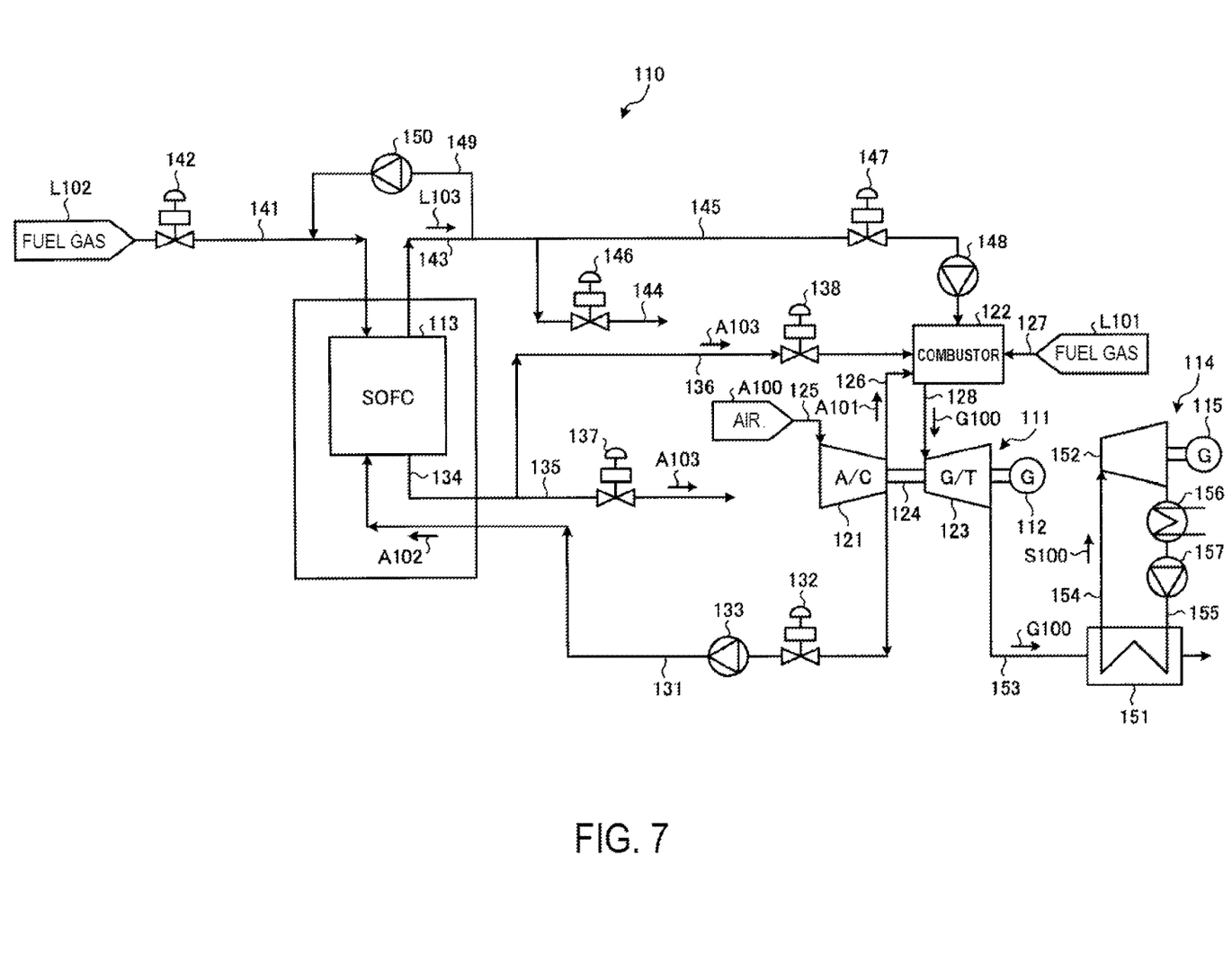
FIG. 7 is a schematic configuration diagram illustrating the power generation system of Embodiment 2.

FIG. 4 is a schematic diagram illustrating a supply line for compressed air in the power generation system according to Embodiment 2 of the present invention. FIG. 5 is a flowchart of supplying compressed air during the operating of the SOFC in the power generation system of Embodiment 2. FIG. 6 is a schematic diagram illustrating a supply line for compressed air in another power generation system according to Embodiment 2. FIG. 7 is a schematic configuration diagram illustrating the power generation system of Embodiment 2.

In Embodiment 2, as illustrated in FIG. 7, a power generation system 110 includes a gas turbine 111 and a power generator 112, an SOFC 113, and a steam turbine 114 and a power generator 115. The power generation system 110 combines power from the gas turbine 111, power from the SOFC 113, and power from the steam turbine 114, so as to be configured to achieve high power generation efficiency.

The gas turbine 111 includes a compressor 121, a combustor 122, and a turbine 123. The compressor 121 and the turbine 123 are coupled in an integrally rotatable manner by a rotating shaft 124. The compressor 121 compresses air A100 obtained by an air intake line 125. The combustor 122 combines and combusts compressed air A101 supplied from the compressor 121 through a first compressed air supply line 126 and fuel gas L101 supplied from a first fuel gas supply line 127. The turbine 123 is rotated by exhaust gas (combusted gas) G100 supplied from the combustor 122 through an exhaust gas supply line 128. Although not illustrated, the turbine 123 is supplied with the compressed air A101 compressed by the compressor 121 through a casing, and cools blades or the like by using this compressed air A101 as cooling air. The power generator 112 is provided coaxially with the turbine 123 and is able to generate power as the turbine 123 rotates. Note that, for example, liquefied natural gas (LNG) is used as the fuel gas L101 supplied to the combustor 122.

The SOFC 113 is supplied with a high-temperature fuel gas as a reductant and with high-temperature air (oxidizing gas) as an oxidant, which react at a predetermined operating temperature to generate power. This SOFC 113 is constituted by an air electrode, a solid electrolyte, and a fuel electrode that are housed in a pressure container. Compressed air A102, which has been compressed by the compressor 121, is supplied to the air electrode and fuel gas is supplied to the fuel electrode, such that power is generated. Note that, here, as fuel gas L102 supplied to the SOFC 113, for example, a liquefied natural gas (LNG), hydrogen ($H_2$) and carbon monoxide (CO), a hydrocarbon gas such as methane ($CH_4$), gas manufactured in a gasification facility for carbonaceous materials such as coal, or the like is used. Also, the oxidizing gas supplied to the SOFC 113 includes approximately 15% to 30% oxygen. Typically, air is appropriate. However, in addition to air, mixed gas of combustion exhaust gas and air, mixed gas of oxygen and air, or the like may be used (hereinafter, the oxidizing gas supplied to the SOFC 113 is referred to as air).

This SOFC 113 is connected to a second compressed air supply line (compressed air supply line) 131 that branches off from the first compressed air supply line 126, so as to be able to supply a portion of the compressed air A102 compressed by the compressor 121 to an introduction part of the air electrode. This second compressed air supply line 131 is provided with a control valve 132 that is capable of adjusting the volume of air to be supplied, and a blower 133 that is capable of boosting the pressure of the compressed air A102, along the air-flow direction. The control valve 132 is provided on the upstream side in the air-flow direction of the second compressed air supply line 131. The blower 133 is provided on the downstream side of the control valve 132. The SOFC 113 is connected with an exhaust air line 134 expelling exhaust air A103 that has been used by the air electrode. This exhaust air line 134 branches into a discharge line 135 that expels the exhaust air A103 used by the air electrode to the outside, and a compressed air circulation line 136 that is connected to the combustor 122. The discharge line 135 is provided with a control valve 137 that is capable of adjusting the volume of air to be expelled. The compressed air circulation line 136 is provided with a control valve 138 that is capable of adjusting the volume of air to be circulated.

Also, the SOFC 113 is provided with a second fuel gas supply line 141 that supplies the fuel gas L102 to the introduction part of the fuel electrode. The second fuel gas supply line 141 is provided with a control valve 142 that is capable of adjusting the volume of fuel gas to be supplied. The SOFC 113 is connected to an exhaust fuel line 143 expelling exhaust fuel gas L103 that has been used by the fuel electrode. The exhaust fuel line 143 branches into a discharge line 144 that performs expelling to the outside, and an exhaust fuel gas supply line 145 that is connected to the combustor 122. The discharge line 144 is provided with a control valve 146 that is capable of adjusting the volume of fuel gas to be expelled. The exhaust fuel gas supply line 145 is provided with a control valve 147 that is capable of adjusting the volume of fuel gas to be supplied, and with a blower 148 that is capable of boosting the pressure of fuel, along the fuel-flow direction. The control valve 147 is provided on the upstream side in the air-flow direction of the fuel gas L103 of the exhaust fuel gas supply line 145. The blower 148 is provided on the downstream side in the flow direction of the fuel gas L103 of the control valve 147.

Also, the SOFC 113 is provided with a fuel gas recirculation line 149 that connects the exhaust fuel line 143 and the second fuel gas supply line 141. The fuel gas recirculation line 149 is provided with a recirculation blower 150 that recirculates the exhaust fuel gas L103 from the exhaust fuel line 143 into the second fuel gas supply line 141.

The steam turbine 114 rotates a turbine 152 with steam produced by a heat recovery steam generator (HRSG) 151. This heat recovery steam generator 151 is connected with an exhaust gas line 153 from the gas turbine 111 (turbine 123), and produces steam S100 through heat exchange between air and high-temperature exhaust gas G100. The steam turbine 114 (turbine 152) is provided with a steam supply line 154 and a water supply line 155 between the turbine and the heat recovery steam generator 151. Also, the water supply line 155 is provided with a condenser 156 and a water supply pump 157. The power generator 115 is provided coaxially with the turbine 152 and is able to generate power as the turbine 152 rotates. Note that the exhaust gas G100 recovered by the heat recovery steam generator 151 is released into the atmosphere after removal of any toxic materials.

The operation of the power generation system 110 of Embodiment 2 is described next. When the power generation system 110 is started, the gas turbine 111, the steam turbine 114, and the SOFC 13 are started in the stated order.

First, in the gas turbine 111, the compressor 121 compresses the air A100, the combustor 122 mixes the compressed air A101 with the fuel gas L101 and combusts the mixed gas, and the turbine 123 rotates due to the exhaust gas G100. Thus, the power generator 112 begins to generate power. Next, in the steam turbine 114, the turbine 152 rotates due to the steam S100 produced by the heat recovery steam generator 151. Thus, the power generator 115 begins to generate power.

Subsequently, in the SOFC 113, first, the compressed air A102 is supplied, and a boost in the pressure as well as an increase in the temperature begins. The control valve 132 is opened to a predetermined extent while the control valve 137 of the discharge line 135 and the control valve 138 of the compressed air circulation line 136 are closed and the blower 133 of the second compressed air supply line 131 is stopped. Then, a portion of the compressed air A102 compressed by the compressor 121 is supplied from the second compressed air supply line 131 toward the SOFC 113. Accordingly, the pressure is raised on the SOFC 113 side by supplying the compressed air A102.

Meanwhile, in the SOFC 113, the fuel gas L102 is supplied to the fuel electrode side and the pressure boost begins. With the control valve 146 of the discharge line 144 and the control valve 147 of the exhaust fuel gas supply line 145 being closed and with the blower 148 being stopped, the control valve 142 of the second fuel gas supply line 141 is opened and the recirculation blower 150 of the fuel gas recirculation line 149 is driven. Then, the fuel gas L102 is supplied from the second fuel gas supply line 141 toward the SOFC 113, and the exhaust fuel gas L103 is recirculated by the fuel gas recirculation line 149. Accordingly, the pressure is raised on the SOFC 113 side by supplying the fuel gas L102.

Next, once the pressure on the air electrode side of the SOFC 113 reaches an outlet pressure of the compressor 121, the control valve 132 is fully opened and the blower 133 is driven. The control valve 137 is simultaneously opened and the exhaust air A103 from the SOFC 113 is expelled from the discharge line 135. Then, the compressed air A102 is supplied toward the SOFC 113 by the blower 133. The control valve 146 is simultaneously opened and the exhaust fuel gas L103 from the SOFC 113 is expelled from the discharge line 144. Next, once the pressure on the air electrode side and the pressure on the fuel electrode side of the SOFC 113 reach a target pressure, the pressure boost of the SOFC 113 ends.

Afterward, once the reaction (power generation) in the SOFC 113 stabilizes and the components of the exhaust air A103 and the exhaust fuel gas L103 stabilize, the control valve 137 is closed while the control valve 138 is opened. Then, the exhaust air A103 from the SOFC 113 is supplied to the combustor 122 through the compressed air circulation line 136. Also, while the control valve 146 is closed, the control valve 147 is opened and the blower 148 is driven. Then, the exhaust fuel gas L103 from the SOFC 113 is supplied to the combustor 122 through the exhaust fuel gas supply line 145. At this point, the fuel gas L101 supplied to the combustor 122 through the first fuel gas supply line 127 is reduced.

Here, the power generation by the power generator 112 due to the driving of the gas turbine 111, the power generation by the SOFC 113, and the power generation by the power generator 115 due to the driving of the steam turbine 114 are all active, such that the power generation system 110 is in steady state operation.

In the meantime, in a typical power generation system, the gas turbine 111 undergoes fluctuations in operation state in response to power generation conditions. In such a case, the outlet pressure of the compressor 121 fluctuates. For example, upon the frequency of the system decreasing, the output of the gas turbine 111 is raised to restore the frequency. That is, the input volume of the fuel gas L101 is increased. This increases the inlet temperature of the turbine 123. The outlet pressure of the compressor 121 increases in response. Therefore, the pressure of the compressed air A102 supplied toward the SOFC 113 is unstable. The SOFC 113 is preferably operated in a stable state, where the pressure is controlled to be equal at the air electrode and at the fuel electrode so as to prevent interflow between the air and the fuel. When the pressure of the compressed air A102 that is supplied is unstable, the operation state become unstable and this may impair the power generation efficiency.

Thus, in the power generation system 110 of Embodiment 2, as illustrated in FIG. 4, the pressure of the compressed air A102 that is supplied to the SOFC 113 is made stable by providing the control valve (pressure control valve) 161 between the blower 133 and the control valve 132 in the second compressed air supply line 131, and by having the control device (controller) 162 control an extent of opening of a control valve 161. Note that the control valve 161 may also be provided on the upstream side of the blower 133 in the second compressed air supply line 131 (closer to the SOFC 113 than the blower 133).

That is, throttling the extent of opening of the control valve 161 tends to reduce the flow rate of the compressed air A102 supplied to the SOFC 113 and to decrease the pressure, while opening the control valve 161 tends to increase the flow rate of the compressed air A102 supplied to the SOFC 113 and to increase the pressure. In order to perform this control, a first detector 163*a* that detects a first pressure of the compressed air A102 is provided on the downstream side of the control valve 132 in the second compressed air supply line 131, between the control valve 132 and the compressor 121. Furthermore, a second detector 163*b* that detects a second pressure of the compressed air A102 is provided on the upstream side of the control valve 161 in the second compressed air supply line 131, between the control valve 161 and the blower 133. Then, a control device 162 controls the extent of opening of the control valve 161 in accordance with the pressure respectively detected by the detectors 163*a*, 163*b*. Note that the pressure used as a standard for the rated operation of the SOFC 113 is detected by a detector (SOFC detector) 164 provided in the SOFC 113 and input to the control device 162. This detector 164 detects a pressure at the air electrode of the SOFC 113.

Here, the method for operating the SOFC 113 in the power generation system 110 of Embodiment 2, which is controlled by the above-described control device 162, is described.

Upon the SOFC 113 reaching rated operation, the control device 162 stores a pressure which has been detected in advance by the detector 164 provided in the SOFC 113, as a standard pressure. Then, in order to achieve the standard pressure, the extent of opening of the control valve 161 is controlled so that the pressure of the compressed air A102 respectively detected by the detectors 163*a*, 163*b* reach a predetermined pressure. At this time, the control device 162 controls the extent of opening of the control valve 161 so that the pressure of the compressed air A102 detected by the first detector 163*a* reaches a predetermined pressure, and performs confirmation of the pressure detected by the first detector 163*a* relative to the pressure of the compressed air A102 detected by the second detector 163*b*.

That is, as illustrated in FIG. 5, during rated operation of the SOFC 113, when there is a fluctuation in the pressure of the compressed air A102 detected by the first detector 163*a* (Yes in step S1), the control device 162 controls the extent of opening of the control valve 161 in accordance with the detected pressure (step S2). Conversely, when there is no fluctuation in the pressure of the compressed air A102 detected by the first detector 163*a* (No in step S1), the control device 162 re-inputs the pressure of the compressed air A102 detected by the first detector 163*a* and performs monitoring. Then, when the pressure of the compressed air A102 detected by the first detector 163*a* reaches a predetermined pressure as a result of controlling the extent of opening of the control valve 161 (Yes in step S3), the control device 162 ends the current control, returns to step S1, re-inputs the pressure of the compressed air A102 detected by the first detector 163*a* and performs monitoring. Conversely, when the pressure of the compressed air A102 detected by the first detector 163*a* is not the predetermined pressure (No in step S3), the control device 162 returns to step S2 and controls the extent of opening of the control valve 161 in accordance with the pressure detected by the first detector 163*a*.

As such, the power generation system 110 of Embodiment 2 includes: the gas turbine 111 having the compressor 121 and the combustor 122; the SOFC 113 having the air electrode and the fuel electrode; the second compressed air supply line 131 supplying a portion of compressed air A102 that has been compressed by the compressor 121 to the air electrode; the control valve 161 provided in the second compressed air supply line 131; the detector 163*a* provided in the second compressed air supply line 131, detecting the pressure of the compressed air A102 supplied to the air electrode; and the control device 162 controlling the extent of opening of the control valve 161 in accordance with a fluctuation in the pressure detected by the detector 163*a*, such that the pressure of the compressed air A102 supplied to the air electrode is held constant.

Accordingly, when there is a fluctuation in the pressure of the compressed air A102 that is supplied to the air electrode of the SOFC 113, the pressure of the compressed air A102 is held constant by controlling the extent of opening of the control valve 161. Thus, the pressure of the compressed air A102 supplied from the gas turbine 111 to the SOFC 113 is held constant. As a result, the SOFC 113 runs with the compressed air A102 having a constant pressure, which enables the SOFC 113 to be in a stable operation state and thus to stably generate electricity.

Also, in the power generation system of Embodiment 2, as illustrated in FIG. 6, the control valve 161 is preferably constituted by a plurality (two in Embodiment 2) of control valves 161*a*, 161*b* being arranged in parallel. For example, the control valve 161*a* may have a comparatively large flow rate adjustment range, and the control valve 161*b* may have a comparatively small flow rate adjustment range. Accordingly, when controlling the extent of opening of the control valve 161, the control device 162 first controls the control valve 161*b* having the smaller flow rate adjustment range, and then controls the control valve 161*a* having the larger flow rate adjustment range. Performing control in this manner enables the control valve 161*b* having the comparatively smaller flow rate adjustment range to complement the range of instability in operation when operation of the control valve 161 having the comparatively large flow rate adjustment range begins. As a result, the control making the pressure of the compressed air A102 constant is performed smoothly and accurately. Note that the plurality of control valves 161*a*, 161*b* need not necessarily differ in the flow rate adjustment range, but the control making the pressure of the compressed air A102 constant may also be performed smoothly and accurately by sequentially controlling the extent of opening.

Also, the method for operating the fuel cell in the power generation system of Embodiment 2 includes the steps of: supplying a portion of compressed air A102 that has been compressed by the compressor 121 in the gas turbine 11 to the air electrode of the SOFC 113; and adjusting a flow rate of the compressed air A102 when there is a fluctuation in the pressure of the compressed air A102 supplied to the SOFC 113, such that the pressure of the compressed air A102 is held constant.

Accordingly, even when there is a fluctuation in the pressure of the compressed air A102 that is supplied to the air electrode of the SOFC 113, the pressure of the compressed air A102 is held constant by adjusting the flow rate of the compressed air A102. As such, the pressure of the compressed air A102 supplied from the gas turbine 111 to the SOFC 113 is held constant. As a result, the SOFC 113 runs with the compressed air A102 having a constant pressure, which enables the SOFC 113 to be in a stable operation state and thus to stably generate electricity.

REFERENCE SIGNS LIST

10 Power generation system
11 Gas turbine
12 Power generator
13 SOFC (Solid Oxide Fuel Cell: Fuel Cell)
14 Steam turbine
15 Power generator
21 Compressor
22 Combustor
23 Turbine
26 First compressed air supply line
31 Second compressed air supply line
32 Control valve
33 Blower (Booster)
33b Pressure detector (Detector)
34 Exhaust air line
35 Discharge line
36 Compressed air circulation line
37 Control valve
38 Control valve
60 Booster circulation line
61 Control valve (First control valve)
62 Control device (Controller)
63 Control valve (Second control valve)
64 First detector
65 Second detector
66 Third detector
A1 Compressed air
A2 Compressed air
110 Power generation system
111 Gas turbine
112 Power generator
113 SOFC (Solid Oxide Fuel Cell: Fuel Cell)
114 Steam turbine
115 Power generator
121 Compressor
22 Combustor
123 Turbine
131 Second compressed air supply line (compressed air supply line)
161 Control valve (pressure control valve)
161a, 161b Control valve
162 Control device (Controller)
163 Detector
164 Detector
A101 Compressed air
A102 Compressed air

The invention claimed is:

1. A power generation power generation system comprising:
a gas turbine having a compressor and a combustor;
a first compressed air supply line supplying compressed air compressed by the compressor to the combustor;
a fuel cell having an air electrode and a fuel electrode;
a second compressed air supply line supplying a portion of the compressed air compressed by the compressor to the air electrode;
a booster provided in the second compressed air supply line, the booster boosting pressure of the compressed air;
a booster circulation line connected to an upstream side and to a downstream side of the booster in the second compressed air supply line;
a first control valve provided in the booster circulation line;
a second control valve provided between the booster circulation line and the fuel cell, in the second compressed air supply line; and
a controller, during starting of the fuel cell, closing the second control valve while opening the first control valve and activating the booster.

2. The power generation system according to claim 1, further comprising a detector detecting at least one of a pressure and a flow rate of compressed air in the booster, wherein
the controller opens the second control valve while closing the first control valve upon at least one of the pressure and the flow rate detected by the detector reaching a predetermined value.

3. A method for starting a fuel cell in a power generation system, comprising the steps of:
upon the starting of the fuel cell, activating a booster provided before an air electrode of the fuel cell to boost a pressure of a portion of compressed air compressed by a compressor of a gas turbine as well as to circulate the portion of the compressed air from a downstream side to an upstream side of the booster; and
upon at least one of the pressure and a flow rate of the portion of the compressed air compressed by the compressor of the gas turbine reaching a predetermined value, supplying the portion of the compressed air to the air electrode of the fuel cell while boosting the pressure of the portion of the compressed air with the booster, wherein
the boosting of the pressure is performed while stopping supplying the portion of the compressed air to the fuel cell.

4. A power generation system comprising:
a gas turbine having a compressor, a combustor and a turbine;
a first compressed air supply line supplying a portion of compressed air compressed by the compressor to the combustor;
a fuel cell having an air electrode and a fuel electrode;
a second compressed air supply line supplying an other portion of the compressed air compressed by the compressor to the air electrode; a booster provided in the second compressed air supply line;
a pressure control valve provided in the second compressed air supply line;
a first detector provided on an upstream side of the pressure control valve in the second compressed air supply line, the first detector detecting a first pressure of the other portion of the compressed air supplied to the air electrode;
a second detector provided on a downstream side of the pressure control valve in the second compressed air supply line, the second detector detecting a second pressure of the other portion of the compressed air supplied to the air electrode;

a controller controlling an extent of opening of the pressure control valve in response to a fluctuation in the first pressure detected by the first detector and a fluctuation in the second pressure detected by the second detector, such that a pressure of the other portion of the compressed air supplied to the air electrode is held constant, in a state where the portion of the compressed air compressed by the compressor is supplied to the combustor via the first compressed air supply line and the turbine starts rotating, and where the other portion of the compressed air is supplied to the air electrode via the second compressed air supply line.

5. The power generation system according to claim 4, wherein the pressure control valve is constituted by a plurality of control valves being arranged in parallel.

6. A method for operating a fuel cell in a power generation system, comprising the steps of:

supplying a portion of a compressed air compressed by a gas turbine to a combustor of the gas turbine;

supplying an other portion of the compressed air compressed by a compressor of the gas turbine to an air electrode of a fuel cell via a pressure control valve; providing a booster in association with the other portion of the compressed air; and upon (i) a first pressure, on an upstream side of the pressure control valve, of the other portion of the compressed air supplied to the fuel cell fluctuating, and (ii) a second pressure, on a downstream side of the pressure control valve, of the other portion of the compressed air fluctuating, adjusting a flow rate of the other portion of the compressed air such that a pressure of the other portion of the compressed air is held constant.

7. The power generation system according to claim 1, wherein the second control valve is arranged between the fuel cell and a downstream connection where the second compressed air supply line connects to the booster circulation line.

8. A power generation system according to claim 4, wherein both the first detector and the second detector are provided in an upstream side of the booster.

* * * * *